(12) United States Patent
Nagano

(10) Patent No.: US 7,229,177 B2
(45) Date of Patent: Jun. 12, 2007

(54) RESTRAINING TEMPERATURE RISE IN LIGHT EXITING-SIDE POLARIZER CONSTITUTING LIQUID CRYSTAL LIGHT VALVE

(75) Inventor: Miki Nagano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 272 days.

(21) Appl. No.: 11/088,982

(22) Filed: Mar. 24, 2005

(65) Prior Publication Data
US 2005/0219430 A1 Oct. 6, 2005

(30) Foreign Application Priority Data
Mar. 25, 2004 (JP) ............................. 2004-088335

(51) Int. Cl.
G03B 21/16 (2006.01)
G02F 1/1335 (2006.01)

(52) U.S. Cl. ..................... 353/52; 353/20; 353/60; 353/84; 349/9; 349/72; 349/199

(58) Field of Classification Search ............... 353/20, 353/52, 57, 60, 84; 349/9, 72, 199
See application file for complete search history.

(56) References Cited

U.S. PATENT DOCUMENTS

| 4,989,954 A | * | 2/1991 | Yokoyama et al. .......... 349/72 |
| 5,136,397 A | * | 8/1992 | Miyashita .................. 348/748 |
| 5,253,074 A | * | 10/1993 | Wortel et al. .............. 348/761 |
| RE36,060 E | * | 1/1999 | Miyashita .................. 348/748 |
| 6,082,861 A | * | 7/2000 | Dove et al. ................ 353/20 |
| 6,322,218 B1 | | 11/2001 | Sugawara et al. |
| 6,856,375 B2 | * | 2/2005 | Yajima et al. .............. 352/52 |
| 6,886,942 B2 | * | 5/2005 | Okada et al. .............. 353/52 |
| 2003/0020884 A1 | | 1/2003 | Okada et al. |

FOREIGN PATENT DOCUMENTS

| JP | A-4-319930 | 11/1992 |
| JP | A 2000-194072 | 7/2000 |
| JP | A-2000-352708 | 12/2000 |
| JP | A-2001-281707 | 10/2001 |
| JP | A 2003-043440 | 2/2003 |
| JP | A 2003-270636 | 9/2003 |

\* cited by examiner

*Primary Examiner*—W. B. Perkey
*Assistant Examiner*—Magda Cruz
(74) *Attorney, Agent, or Firm*—Oliff & Berridge, PLC

(57) ABSTRACT

Embodiments of the invention restrain temperature rise in a light exiting-side polarizer included in a liquid crystal light valve without limiting the quantity of light incident on the liquid crystal light valve and a projector that has a liquid crystal light valve to modulate incident light in accordance with a provided image signal and that projects an image represented by modulated light exiting from the liquid crystal light valve. The projector has a black level adjusting unit to adjust black level of the image signal, a temperature-detecting unit to detect temperature of the light exiting-side polarizer, and a control unit to control operation of the black level-adjusting unit. The control unit is characterized by causing the black level-adjusting unit to adjust the black level of the image signal on the basis of the temperature detected by the temperature-detecting unit in order to restrain temperature rise in the light exiting-side polarizer.

17 Claims, 6 Drawing Sheets

RESTRAINING TEMPERATURE RISE IN LIGHT EXITING-SIDE POLARIZER CONSTITUTING LIQUID CRYSTAL LIGHT VALVE

BACKGROUND

Exemplary embodiments of the invention relate to a technique for restraining temperature rise in a light exiting-side polarizer constituting a liquid crystal light valve in a projector.

The related art includes a liquid crystal light valve that is used as an electro-optical device of a projector that projects an image.

This liquid crystal light valve includes a transmission liquid crystal panel, a light incident-side polarizer provided on a light incident surface side of this liquid crystal panel, and a light exiting-side polarizer provided on a light exiting surface side. In the liquid crystal panel, the direction of polarization of polarized light exiting from the light incident-side polarizer is modulated in accordance with a driving voltage applied to each pixel according to an image signal. Of the light modulated in the liquid crystal panel, only the light having a direction of polarization coincident with the polarization axis of the light exiting-side polarizer is caused to exit from the light exiting-side polarizer. The other light is absorbed by the light exiting-side polarizer. Thus, the liquid crystal light valve modulates incident light in accordance with the image signal.

Therefore, in the liquid crystal panel, the light incident-side polarizer and the light exiting-side polarizer constituting the liquid crystal light valve, there is a loss in exiting light with respect to incident light and this loss causes heating and temperature rise. Particularly, in the light exiting-side polarizer, the temperature rises at a higher degree because it absorbs a large quantity of light. The temperature rise in the light incident-side polarizer is relatively low because the light incident on the light incident-side polarizer is usually light polarized in the direction of polarization that is the same as the polarization axis of the light incident-side polarizer in consideration of efficiency.

In a related art projector, a liquid crystal light valve is cooled by blowing from a cooling fan, and the number of rotations of the cooling fan is controlled so that the temperature near the liquid crystal light valve can be maintained within a predetermined range of temperature specification, or the quantity of light emission of a light source is controlled so that temperature rise in a light exiting-side polarizer and a liquid crystal panel is restrained. See, for example, related art document JP-A-2000-194072.

Alternatively, in another related art projector, a power supply to a light source that generates illuminating light is shut down when the temperature of a light exiting-side polarizer becomes abnormal. Accordingly, temperature rise in the light exiting-side polarizer and a liquid crystal panel is restrained. See, for example, related art document JP-A-2003-43440.

SUMMARY

The temperature rise in the light exiting-side polarizer is caused by the quantity of light absorbed by the light exiting-side polarizer, as described above. Thus, as a technique for reducing the quantity of light absorbed by the light exiting-side polarizer and thus restraining temperature rise in the light exiting-side polarizer, it may be considered to limit the quantity of light exiting from the light source to limit the quantity of light incident on the liquid crystal light valve and thus reduce the quantity of light absorbed by the light exiting-side polarizer.

However, in the case of this technique, when the projector is being used, the brightness of a projected image will be limited in accordance with the temperature rise in the light exiting-side polarizer.

In the case of using the projector, for example, for business, it is desired that priority should be given to the brightness of a projected image so that the image can be projected at maximum possible brightness for projection. In such a case, if the quantity of light incident on the liquid crystal light valve is limited and the brightness of the projected image changes in accordance with temperature rise in the liquid crystal light valve, a user viewing the image may feel uncomfortable which is not desirable.

Therefore, it is desired that temperature rise in the light exiting-side polarizer included in the liquid crystal light valve is restrained while limiting the quantity of light incident on the liquid crystal light valve.

Thus, it is an object of exemplary embodiments of this invention to provide a technique to address and/or solve the foregoing and/or other problems of the related art technique and restrain temperature rise in the light exiting-side polarizer included in the liquid crystal light valve without limiting the quantity of light incident on the liquid crystal light valve.

To address and/or achieve at least a part of the above-described object, a first apparatus according to exemplary embodiments of this invention is a projector that has a liquid crystal light valve to modulate incident light in accordance with a provided image signal and project an image represented by modulated light exiting from the liquid crystal light valve.

The light valve has a light exiting-side polarizer provided on a light exiting surface side of the liquid crystal light valve.

The projector has a black level adjusting unit to adjust black level of the image signal, a temperature detecting unit to detect temperature of the light exiting-side polarizer, and a control unit to control operation of the black level adjusting unit.

The control unit causes the black level adjusting unit to adjust the black level of the image signal on the basis of the temperature detected by the temperature detecting unit in order to restrain temperature rise in the light exiting-side polarizer.

According to the above-described projector of exemplary embodiments of the invention, by adjusting the black level of the image signal on the basis of the temperature detected by the temperature detecting unit, it is possible to restrain temperature rise in the light exiting-side polarizer. This enables restraining of temperature rise in the light exiting-side polarizer included in the liquid crystal light valve without limiting the quantity of light incident on the liquid crystal light valve.

It is preferred that the above-described projector of exemplary embodiments of the invention has a cooling fan for cooling the liquid crystal light valve, and that the control unit causes the cooling fan to adjust the quantity of wind of the cooling fan on the basis of the temperature detected by the temperature detecting unit before causing the black level adjusting unit to adjust the black level of the image signal, in order to restrain temperature rise in the light exiting-side polarizer.

Thus, since it is possible to adjust the quantity of wind of the cooling fan to restrain temperature rise in the light exiting-side polarizer before restraining temperature rise in the light exiting-side polarizer by adjusting the black level of the image signal, temperature rise in the light exiting-side polarizer can be restrained by adjusting the quantity of wind of the cooling fan before the image quality of the projected image is lowered by adjusting the black level of the image signal.

Alternatively, it is preferred that the above-described projector of exemplary embodiments of the invention has a cooling fan for cooling the liquid crystal light valve, and that the control unit causes the black level adjusting unit to adjust the black level of the image signal and then causes the cooling fan to adjust the quantity of wind of the cooling fan on the basis of the temperature detected by the temperature detecting unit, in order to restrain temperature rise in the light exiting-side polarizer.

Thus, since it is possible to restrain temperature rise in the light exiting-side polarizer by adjusting the black level of the image signal and then further restrain temperature rise in the light exiting-side polarizer by adjusting the quantity of wind of the cooling fan, temperature rise in the light exiting-side polarizer can be effectively restrained.

Moreover, it is preferred that the above-described projector has a cooling fan for cooling the liquid crystal light valve, and that the control unit decides (1) whether it should operate in a first multiple-control mode to cause the cooling fan to adjust the quantity of wind of the cooling fan on the basis of the temperature detected by the temperature detecting unit before causing the black level adjusting unit to adjust the black level of the image signal in order to restrain temperature rise in the light exiting-side polarizer, or (2) in a second multiple-control mode to cause the black level adjusting unit to adjust the black level of the image signal and then cause the cooling fan to adjust the quantity of wind of the cooling fan on the basis of the temperature detected by the temperature detecting unit in order to restrain temperature rise in the light exiting-side polarizer, in accordance with a user's instruction.

Thus, the user can select the first multiple-control mode or the second multiple-control mode for control operation to control temperature rise in the light exiting-side polarizer.

Moreover, it is preferred that the above-described projector of exemplary embodiments of the invention has an incident light quantity adjusting unit to adjust the light quantity of the incident light, and that the control unit causes the black level adjusting unit to adjust the black level of the image signal and then causes the incident light quantity adjusting unit to adjust the light quantity of the incident light on the basis of the temperature detected by the temperature detecting unit, in order to restrain temperature rise in the light exiting-side polarizer.

Thus, since it is possible to restrain temperature rise in the light exiting-side polarizer by adjusting the black level of the image signal and then restrain temperature rise in the light exiting-side polarizer by adjusting the light quantity of the incident light on the liquid crystal light valve, temperature rise in the light exiting-side polarizer can be effectively restrained.

Moreover, it is preferred that the above-described projector of exemplary embodiments of the invention has an incident light quantity adjusting unit to adjust the light quantity of the incident light, and that the control unit causes the black level adjusting unit to adjust the black level of the image signal, then causes the cooling fan to adjust the quantity of wind of the cooling fan, and further causes the incident light quantity adjusting unit to adjust the light quantity of the incident light on the basis of the temperature detected by the temperature detecting unit, in order to restrain temperature rise in the light exiting-side polarizer.

Thus, since it is possible to restrain temperature rise in the light exiting-side polarizer by adjusting the black level of the image signal and adjusting the quantity of wind of the cooling fan, and then restrain temperature rise in the light exiting-side polarizer by adjusting the light quantity of the incident light on the liquid crystal light valve, temperature rise in the light exiting-side polarizer can be effectively restrained.

Moreover, it is preferred that the above-described projector of exemplary embodiments of the invention has an incident light quantity adjusting unit to adjust the light quantity of the incident light, and that the control unit operates in the first or second multiple-control mode and then causes the incident light quantity adjusting unit to adjust the light quantity of the incident light on the basis of the temperature detected by the temperature detecting unit.

Thus, since it is possible to restrain temperature rise in the light exiting-side polarizer in the first or second multiple-control mode and further restrain temperature rise in the light exiting-side polarizer by adjusting the light quantity of the incident light on the liquid crystal light valve, temperature rise in the light exiting-side polarizer can be effectively restrained.

A second apparatus according to exemplary embodiments of this invention is a projector that has a liquid crystal light valve to modulate incident light in accordance with a provided image signal and that projects an image representing modulated light exiting from the liquid crystal light valve. The projector has a black level adjusting unit having a first mode to adjust black level of the image signal to a standard gradation level and a second mode to adjust the black level to a gradation level higher than the standard gradation level, and a control unit to cause the black level adjusting unit to operate in the first mode or the second mode.

According to the above-described projector of exemplary embodiments of the invention, by adjusting the black level of the image signal to the gradation level higher than the standard gradation level, it is possible to restrain temperature rise in a light exiting-side polarizer. Thus, temperature rise in the light exiting-side polarizer included in the liquid crystal light valve can be restrained without limiting the quantity of light incident on the liquid crystal light valve.

It is preferred that in the above-described projector of exemplary embodiments of the invention, the liquid crystal light valve has a light exiting-side polarizer provided on a light exiting surface side of the liquid crystal light valve, the projector has a temperature detecting unit to detect temperature of the light exiting-side polarizer provided on the light exiting surface side of the liquid crystal light valve, and the control unit decides whether it should cause the black level adjusting unit to operate in the first mode or the second mode on the basis of the temperature detected by the temperature detecting unit.

Thus, whether operation should be made in the first mode or the second mode can be decided on the basis of the temperature detected by the temperature detecting unit.

Moreover, it is preferred that in the above-described projector of exemplary embodiments of the invention, the liquid crystal light valve has a light exiting-side polarizer provided on a light exiting surface side of the liquid crystal light valve, the projector has a temperature detecting unit to detect temperature of the light exiting-side polarizer provided on the light exiting surface side of the liquid crystal light valve, and the control unit, in the case of causing the black level adjusting unit to operate in the second mode, further causes the black level adjusting unit to operate to adjust the black level of the image signal to plural gradation levels higher than the standard gradation level on the basis of the temperature detected by the temperature detecting unit.

Thus, by adjusting the black level of the image signal to plural gradation levels higher than the standard gradation level on the basis of the temperature detected by the temperature detecting unit, it is possible to restrain temperature rise in the light exiting-side polarizer.

Moreover, it is preferred that the above-described projector of exemplary embodiments of the invention has a cooling fan to cool the liquid crystal light valve, and that the control unit causes the cooling fan to adjust the quantity of wind of the cooling fan on the basis of the temperature detected by the temperature detecting unit before causing the black level adjusting unit to operate in the second mode.

Thus, since the quantity of wind of the cooling fan can be adjusted before adjusting the black level of the image signal, it is possible to restrain temperature rise in the light exiting-side polarizer by adjusting the quantity of wind of the cooling fan before the image quality of the projected image is lowered by adjusting the black level of the image signal.

Alternatively, it is preferred that the above-described projector of exemplary embodiments of the invention has a cooling fan for cooling the liquid crystal light valve, and that the control unit causes the black level adjusting unit to operate in the second mode and then causes the cooling fan to adjust the quantity of wind of the cooling fan on the basis of the temperature detected by the temperature detecting unit.

Thus, since it is possible to restrain temperature rise in the light exiting-side polarizer by adjusting the black level of the image signal and then further adjusting the quantity of wind of the cooling fan, temperature rise in the light exiting-side polarizer can be effectively restrained.

Moreover, it is preferred that the above-described projector of exemplary embodiments of the invention has a cooling fan for cooling the liquid crystal light valve, and that the control unit decides whether it should (1) operate in a first multiple-control mode to cause the cooling fan to adjust the quantity of wind of the cooling fan on the basis of the temperature detected by the temperature detecting unit before causing the black level adjusting unit to operate in the second mode, or (2) in a second multiple-control mode to cause the black level adjusting unit to operate in the second mode and then further cause the cooling fan to adjust the quantity of wind of the cooling fan on the basis of the temperature detected by the temperature detecting unit, in accordance with a user's instruction.

Thus, the user can select the first multiple-control mode or the second multiple-control mode for control operation to restrain temperature rise in the light exiting-side polarizer.

Moreover, it is preferred that the above-described projector of exemplary embodiments of the invention has an incident light quantity adjusting unit to adjust the light quantity of the incident light, and that the control unit causes the black level adjusting unit to operate in the second mode and then further causes the incident light quantity adjusting unit to adjust the light quantity of the incident light on the basis of the temperature detected by the temperature detecting unit.

Thus, since it is possible to restrain temperature rise in the light exiting-side polarizer by adjusting the black level of the image signal and then further restrain temperature rise in the light exiting-side polarizer by adjusting the light quantity of the incident light on the liquid crystal light valve, temperature rise in the light exiting-side polarizer can be effectively restrained.

Moreover, it is preferred that the above-described projector of exemplary embodiments of the invention has an incident light quantity adjusting unit to adjust the light quantity of the incident light, and that the control unit causes the black level adjusting unit to operate in the second mode, then causes the cooling fan to adjust its quantity of wind, and further causes the incident light quantity adjusting unit to adjust the light quantity of the incident light on the basis of the temperature detected by the temperature detecting unit.

Thus, since it is possible to restrain temperature rise in the light exiting-side polarizer by adjusting the black level of the image signal and adjusting the quantity of wind of the cooling fan, and further restrain temperature rise in the light exiting-side polarizer by adjusting the light quantity of the incident light on the liquid crystal light valve, temperature rise in the light exiting-side polarizer can be effectively restrained.

Moreover, it is preferred that the above-described projector of exemplary embodiments of the invention has an incident light quantity adjusting unit to adjust the light quantity of the incident light, and that the control unit operates in the first or second multiple-control mode and then further causes the incident light quantity adjusting unit to adjust the light quantity of the incident light on the basis of the temperature detected by the temperature detecting unit.

Thus, since it is possible to restrain temperature rise in the light exiting-side polarizer in the first or second multiple-control mode and further restrain temperature rise in the light exiting-side polarizer by adjusting the light quantity of the incident light on the liquid crystal light valve, temperature rise in the light exiting-side polarizer can be effectively restrained.

Moreover, it is preferred that in the above-described projector of exemplary embodiments of the invention, the control unit decides whether it should cause the black level adjusting unit to operate in the first mode or the second mode, in accordance with a user's instruction.

Thus, the user can cause the black level adjusting unit to operate in the first mode to adjust the black level of the image signal to the standard gradation level or in the second mode to adjust the black level to the gradation level higher than the standard gradation level.

DETAILED DESCRIPTION OF PREFERRED EMBODIMENTS

Hereinafter, exemplary embodiments of this invention will be described in the following order with reference to specific examples.

Figure 1:
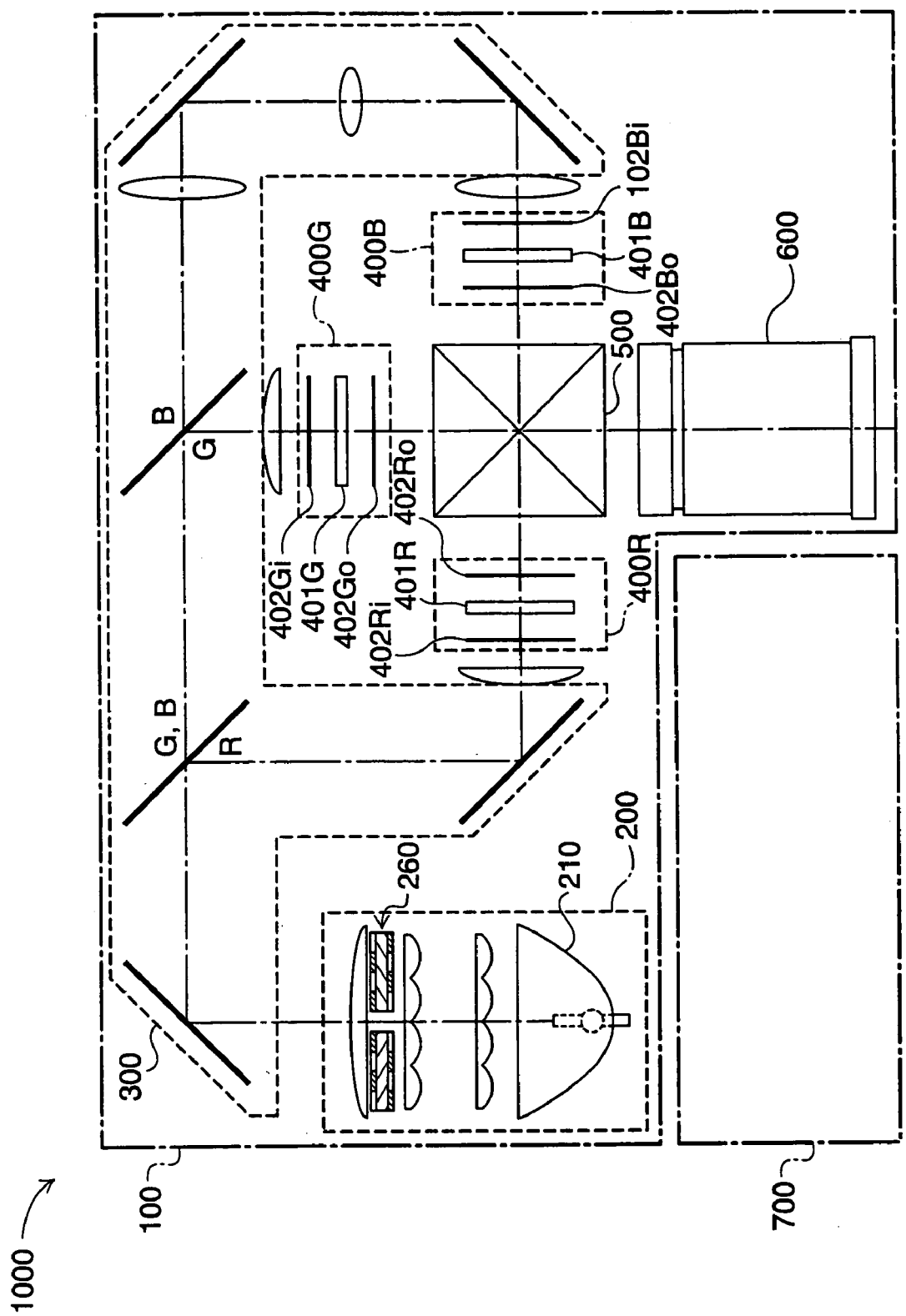
FIG. 1 is a schematic showing a projector to which exemplary embodiments of this invention are applied.

A. Structure of Projector:
B. Temperature Control:
C. Modifications:

A. Structure of Projector:

FIG. 1 is a schematic showing a projector to which exemplary embodiments of this invention are applied. This projector 1000 includes an optical system 100 for projecting an image and a control system 700 for controlling the projection of the image.

The optical system 100 has an illumination system 200, a color separation system 300, three light valves (LVs) 400R, 400G and 400B, a cross dichroic prism 500, and a projection lens (projection system) 600.

The illumination system 200 includes a polarization conversion system 260. It converts light exiting from a light source 210 to one type of linearly polarized light in a uniform direction of polarization and causes the converted light to exit. The light exiting from the illumination system is separated into three color light beams of red (R), green (G) and blue (B) in a color separation system 300. The separated color light beams are modulated by the light valves 400R, 400G and 400B, respectively, in accordance with an image signal.

The R light valve 400R has a liquid crystal panel 401R, and a light incident-side polarizer 402Ri and a light exiting-side polarizer 402Ro provided on a light incident surface side and a light exiting surface side of the liquid crystal panel, respectively. The light incident-side polarizer 402Ri and the light exiting-side polarizer 402Ro are affixed to transmissive glass plates, not shown, at positions away from the liquid crystal panel 401R.

Since the R-light incident on the R light valve 400R exits from the illumination system 200 having the polarization conversion system 260 as described above, it is linearly polarized light. The polarization axis of the light incident-side polarizer 402Ri is set to be the same as the direction of polarization of the linearly polarized light that is incident thereon. Therefore, most of the R-light incident on the light incident-side polarizer 402Ri transmits as it is through the light incident-side polarizer 402Ri. The direction of polarization of the polarized light exiting from the light incident-side polarizer 402Ri is modulated in accordance with an image signal incident on the liquid crystal panel 401R. The image signal is supplied from an image processing unit, which will be described later. The light exiting-side polarizer 402Ro transmits only the light having the direction of polarization that is the same as the polarization axis, of the light modulated by the liquid crystal panel 401R, and causes the light to exit, and also absorbs the light having the other directions of polarization. Thus, the R light valve 400R modulates the incident R-light in accordance with the image signal.

Similarly, the G light valve 400G modulates the incident G-light in accordance with an image signal, and the B light valve 400B modulates the incident B-light in accordance with an image signal.

The pencils of light of three colors modulated by the light valves 400R, 400G and 400B are combined by the cross dichroic prism 500 and projected by the projection system 600 onto a screen, not shown.

The structure and function of each part of the optical system as shown in FIG. 1 are described in detail, for example, in JP-A-2003-270636 disclosed by the present applicant and therefore will not be described further in detail in this specification.

Figure 2:
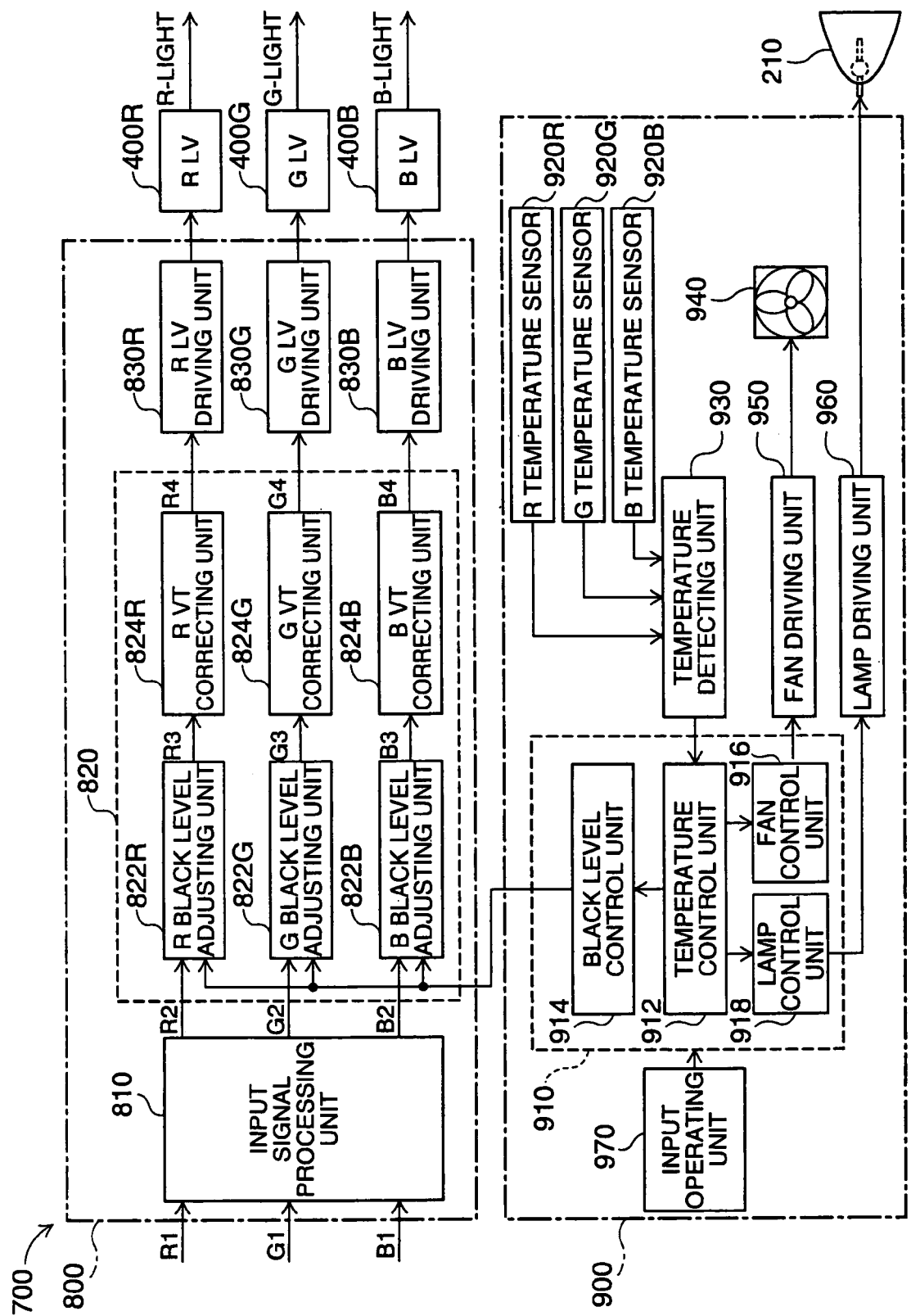
FIG. 2 is a schematic showing a control system 700 of FIG. 1.

FIG. 2 is a schematic showing the control system 700 of FIG. 1. The control system 700 has an image processing unit 800 and a processing control unit 900.

The image processing unit 800 has an input signal processing unit 810, a correction processing unit 820, and R, G and B light valve driving units 830R, 830G and 830B.

When R, G and B signals R1, G1 and B1 are inputted to the input signal processing unit 810 as image signals from outside, if these signals are analog signals, the input signal processing unit 810 performs analog/digital conversion or performs frame rate conversion and resizing processing in accordance with the signal format of these signals, to convert these signals to image data usable at the subsequent processing unit. In the case of displaying a menu, the input signal processing unit 810 superimposes a menu screen. If the inputted image signals are composite signals, the input signal processing unit 810 demodulates the composite signals and performs processing to separate R, G and B signals and synchronizing signal.

The correction processing unit 820 performs correction of R, G and B signals R2, G2 and B2 outputted from the input signal processing unit 810 and thus corrects the gradation characteristics of transmitted light that is to exit from the light valves 400R, 400G and 400B. This correction processing unit 820 includes R, G and B black level adjusting units 822R, 822G and 822B, and R, G and B VT correcting units 824R, 824G and 824B, as well as a color correcting unit and the like, not shown.

The black level adjusting units 822R, 822G and 822B adjust the black level of R, G and B signals R3, G3 and B3 to be outputted, with respect to the R, G and B signals R2, G2 and B2 outputted from the input signal processing unit 810, in accordance with an instruction supplied from a control unit 910. The black level means the minimum gradation level of an image signal. This black level is usually set at such a gradation level that light exiting from the light valve is interrupted at least theoretically (hereinafter referred to as "standard gradation level").

Figure 3:
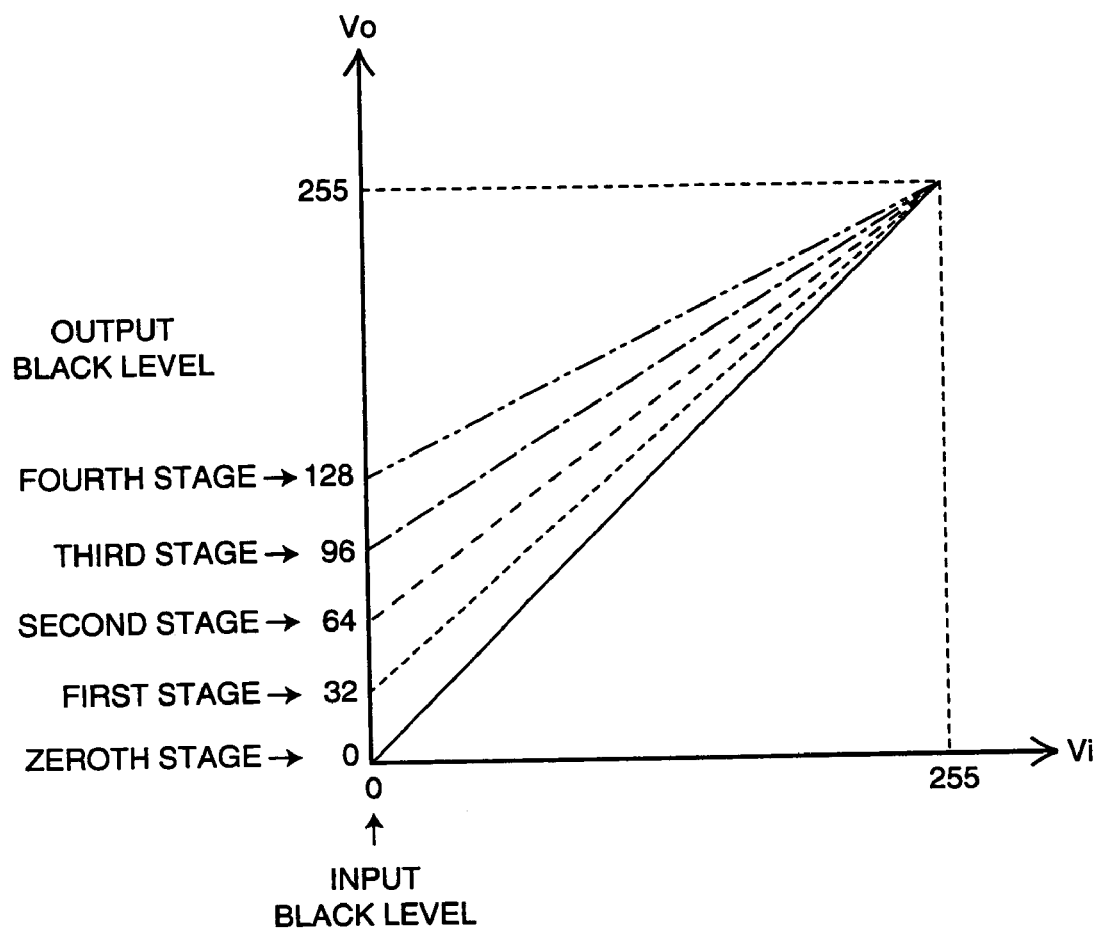
FIG. 3 is a schematic showing input/output characteristics of an R signal in an R black level adjusting unit 822R.

FIG. 3 is a schematic showing input/output characteristics of the R signal at the R black level adjusting unit 822R. In the following description, the number of bits of each signal is assumed to be eight. The black level of the R signal is usually set at a standard gradation level "0", and the gradation level of an output Vo is set to change from 0 to 255 in accordance with changes of the gradation level of an input Vi from 0 to 255.

The R black level adjusting unit 822R can adjust the R signal to have such gradation characteristics that is has plural stages of gradation levels as the black level of the output Vo with respect to the black level of the input Vi (standard gradation level "0"). FIG. 3 shows an example in which the black level of the output Vo can be adjusted in four stages of gradation levels "32", "64", "96" and "128" with respect to the standard gradation level "0". For example, when an instruction to raise the black level is issued from the control unit 910, the input/output characteristics of the R black level adjusting unit 822R are set to the first stage so that the black level of the output Vo is "32" instead of the standard gradation level "0", and the inputted R signal is converted in accordance with the input/output characteristics thus set. If an instruction to raise the black level further is issued from the control unit 910, the input/output characteristics are set to the second stage so that the black level of the output Vo is "64", and the inputted R signal is converted in accordance with the input/output characteristics thus set. In this manner, the input/output characteristics of the R black level adjusting unit 822R are sequentially set to the input/output characteristics of the first stage, second stage, third stage and fourth stage in accordance with instructions to raise the black level from the control unit 910.

Such a black level adjusting unit can be realized, for example, by storing plural input/output characteristic data having different gradation levels as the black level of the output, to a lookup table in advance, and selectively using the corresponding input/output characteristic data in accordance with an instruction from the control unit 910.

Although the R black level adjusting unit 822R is described in the above explanation, similar explanation applies to the G and B black level adjusting units 822G and 822B.

As the black levels of the R, G and B signals are raised, when the black levels of the R, G and B signals are inputted to the R, G and B light valves 400R, 400G and 400B, the quantity of the color light beams absorbed by the light exiting-side polarizers 402Ro, 402Go and 402Bo, respectively, can be reduced. Therefore, the quantity of the color light beams absorbed by the light exiting-side polarizers 402Ro, 402Go and 402Bo, respectively, can be effectively reduced as a whole. This makes is possible to restrain temperature rise in the light exiting-side polarizers 402Ro, 402Go and 402Bo.

The VT correcting units 824R, 824G and 824B of FIG. 2 perform γ correction on the R, G and B signals R3, G3 and B3 outputted from the black level adjusting units 822R, 822G and 822B in consideration of VT characteristics (voltage-transmittance characteristics) of the light valves 400R, 400G and 400B. The VT correcting units 824R, 824G and 824B usually include lookup tables.

The light valve driving units 830R, 830G and 830B generate driving signals for driving the light valves 400R, 400G and 400B on the basis of R, G and B signals R4, G4 and B4 outputted from the correction processing unit 820.

The light valves 400R, 400G and 400B are driven in accordance with the driving signals outputted from the light valve driving units 830R, 830G and 830B and modulate incident R-light, G-light and B-light, as described above.

The control unit 900 has the control unit 910, R, G and B temperature sensors 920R, 920G and 920B, a temperature detecting unit 930, a cooling fan 940, a fan driving unit 950, a lamp driving unit 960, and an input operating unit 970.

The control unit 910 is constituted by a computer having a CPU and a memory, not shown. As the CPU reads out a program stored in the memory and executes the program, the control unit 910 controls the input signal processing unit 810, the correction processing unit 820, the light valve driving units 830R, 830G and 830B, the fan driving unit 950, and the lamp driving unit 960. Particularly, the drawing shows a case where the control unit 910 functions as a temperature control unit 912, a black level control unit 914, a fan control unit 916 and a lamp control unit 918.

The control unit 910 also carries out various controls in accordance with user's instructions inputted via the input operating unit 970. For example, when the user operates an operating panel or a remote controller as the input operating unit 970 and instructs menu display, the control unit 910 controls the input signal processing unit 810 to execute menu display. Then, the user can carry out various settings and controls in accordance with the menu. For example, it is possible to turn on/off a temperature control operation, which will be described later, and to set various control conditions such as control temperature in the temperature control operation.

The temperature control unit 912 controls the black level control unit 914, the fan control unit 916 and the lamp control unit 918 in accordance with the temperature detected by the temperature detecting unit 930.

The black level control unit 914 controls the operation of the R, G and B black level adjusting units 822R, 822G and 822B in accordance with an instruction from the temperature control unit 912 and thus adjusts the black level of the R, G and B signals to be outputted.

The fan control unit 916 controls the operation of the fan driving unit 950 on the basis of an instruction from the temperature control unit 912 and thus controls the number of rotations of the cooling fan 940 to adjust the quantity of wind.

The lamp control unit 918 controls the operation of the lamp driving unit 960 on the basis of an instruction from the temperature control unit 912 and thus adjusts the quantity of light exiting from the light source 210.

The temperature detecting unit 930 detects temperature corresponding to detection signals outputted from the R, G and B temperature sensors 920R, 920G and 920B. The detected temperature information is supplied to the temperature control unit 912.

Here, the temperature sensors 920R, 920G and 920B are arranged near the corresponding R, G and B light vales 400R, 400G and 400B, respectively. The temperature sensors 920R, 920G and 920B detect the temperature of the air near the light valves and output corresponding detection signals.

Figure 4A:
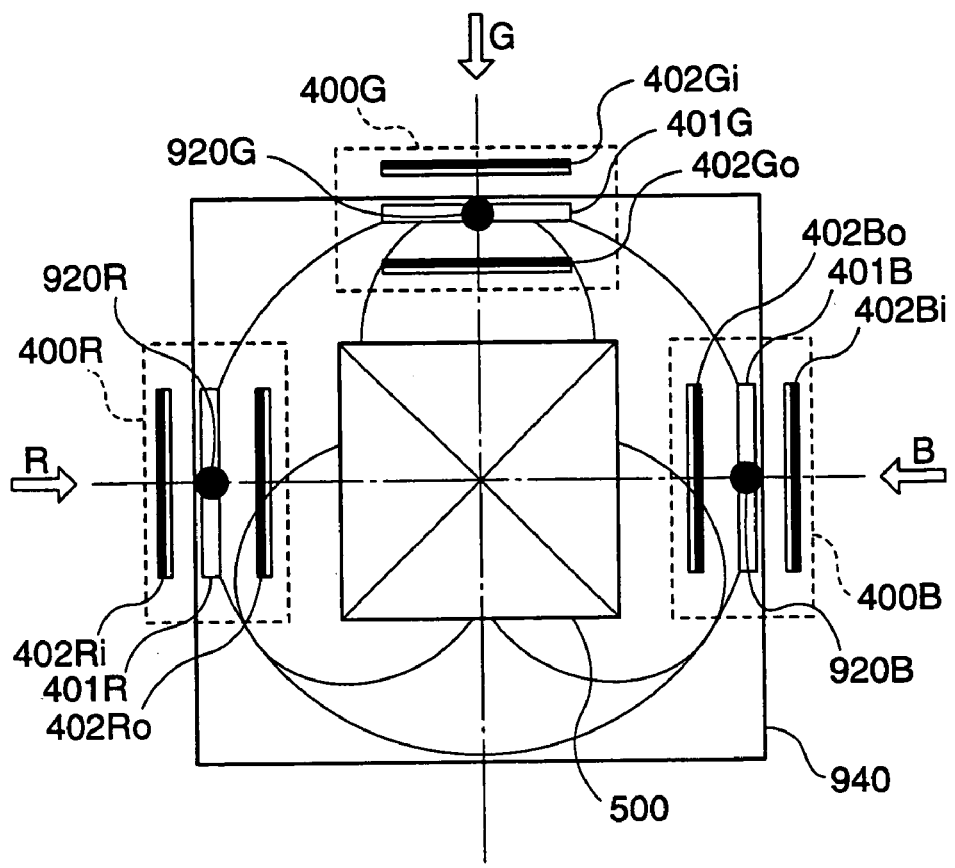
FIGS. 4A–B are schematic showing arrangement positions of temperature sensors.
Figure 4B:
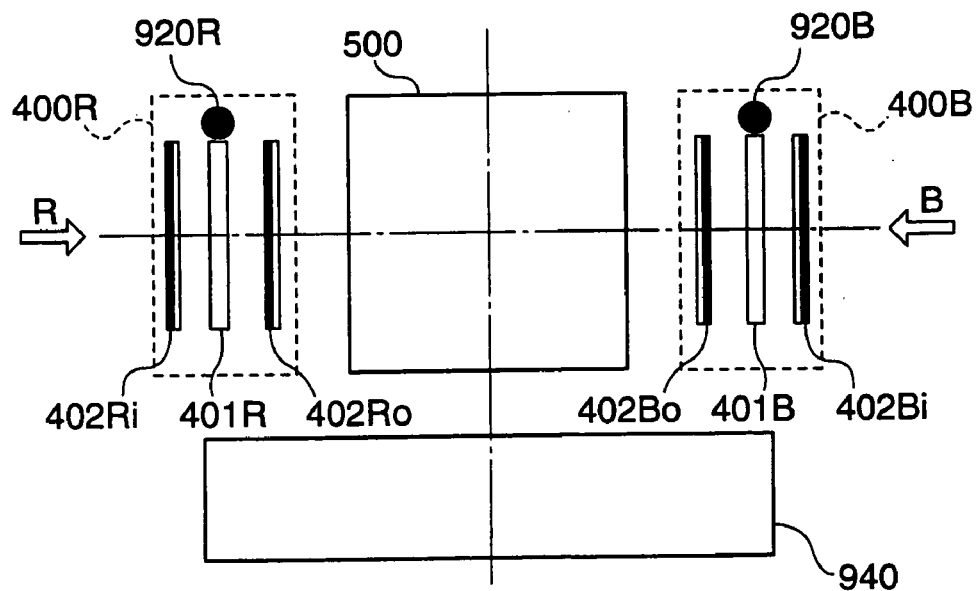

FIGS. 4A–B are schematics showing the arrangement positions of the temperature sensors. FIG. 4A is a schematic enlarged plan view showing the cross dichroic prism 500 and the R, G and B light valves 400R, 400G and 400B. FIG. 4B is a schematic side view of them, as viewed from the side of the projection system 600.

As the temperature sensors 920R, 920G and 920B, for example, thermistors are used. As for the arrangement positions of these temperature sensors, they are arranged at upper parts in the corresponding light valves 400R, 400G and 400B, opposite to the cooling fan 940 arranged below the light valves 400R, 400G and 400B, so that these temperature sensors detect the temperature of the air that is raised as the blowing from the cooling fan 940 cools the light valves 400R, 400G and 400B. Therefore, the temperature sensors 920R, 920G and 920B do not directly detect the temperatures of the light exiting-side polarizers 402Ro, 402Go and 402Bo of the corresponding light valves 400R, 400G and 400B. However, the detected temperature of the air is the temperature of the air raised by cooling the liquid crystal panels and polarizers constituting the light valves and therefore has predetermined correlation with the temperatures of the light exiting-side polarizers. Therefore, by detecting the temperature of the air, it is possible to indirectly detect the temperatures of the light exiting-side polarizers.

To directly detect the temperatures of the light exiting-side polarizers 402Ro, 402Go and 402Bo of the light valves 400R, 400G and 400B, the temperature sensors 920R, 920G and 920B may be installed on the corresponding light exiting-side polarizers 402Ro, 402Go and 402Bo.

As described above, the temperature control unit 912 controls the black level control unit 914, the fan control unit 916 and the lamp control unit 918 in accordance with the temperature detected by the temperature detecting unit 930 and thus controls the temperature detected by the temperature detecting unit 930. Hereinafter, the temperature control operation at this temperature control unit 912 will be described.

Figure 5:
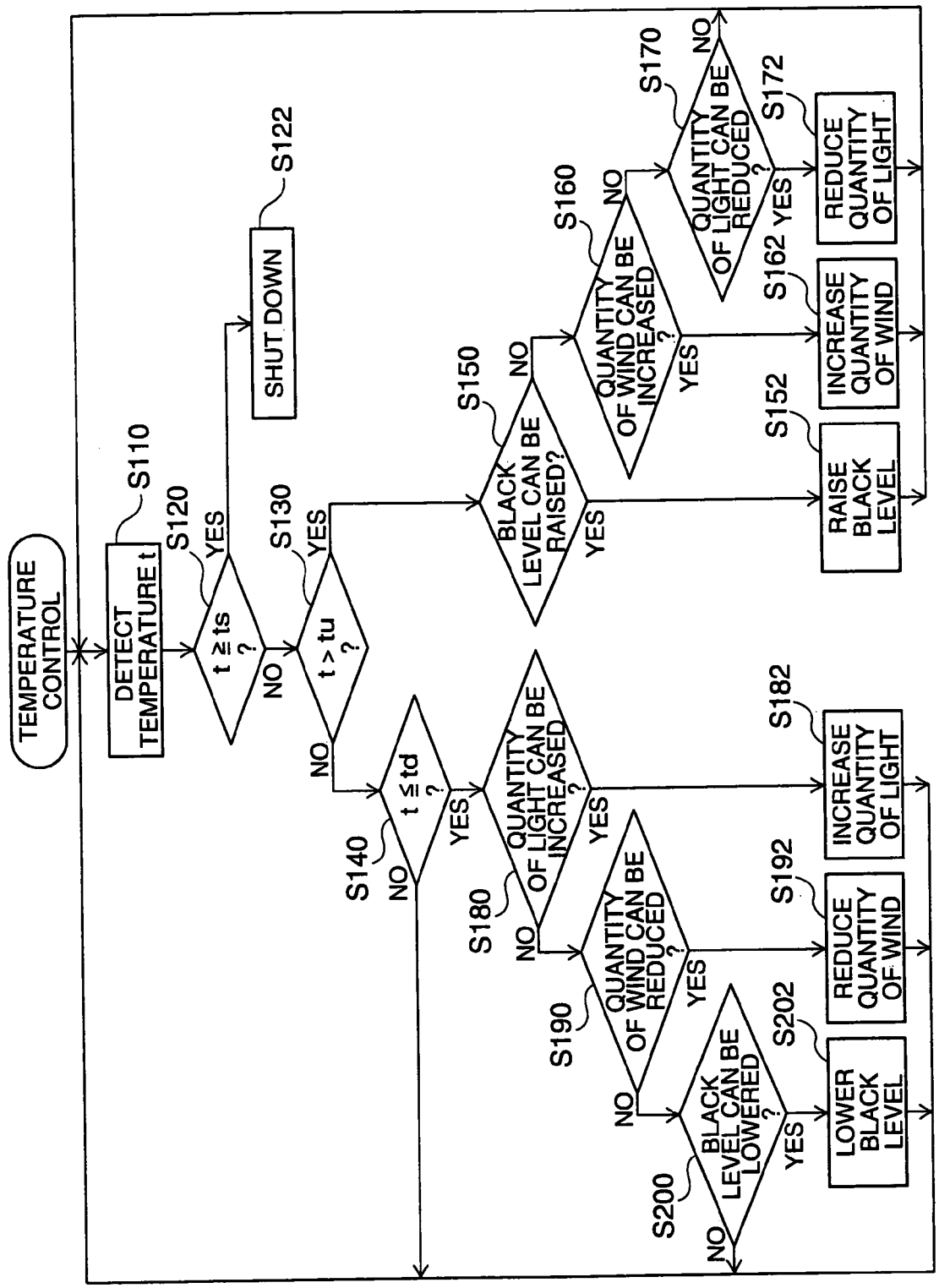
FIG. 5 is a flowchart showing a temperature control operation at a temperature control unit 912.

B. Temperature Control:

FIG. 5 is a flowchart showing the temperature control operation at the temperature control unit 912. When the projector is started, the CPU, not shown, of the control unit 910, reads out a program stored in the memory and executes the program, and the control unit 910 functions as the temperature control unit 912, as described above. Thus, the temperature control operation shown in FIG. 5 is constantly executed.

First, at step S110, the temperature detecting unit 930 detects the temperatures near the light valves 400R, 400G and 400B. Specifically, the temperatures near the light valves 400R, 400G and 400B are found on the basis of outputs from the temperature sensors 920R, 920G and 920B respectively. Of the three temperatures thus found, the highest temperature is assumed to be detected temperature t° C.

Next, at step S120, the detected temperature t is compared with shutdown temperature ts (for example, 80° C.), and if the detected temperature t is equal to or higher than the shutdown temperature ts (t$\geq$ts), the processing goes to step S122 and a power supply, not shown, is turned off to shut down the operation of the projector. On the other hand, if t$\geq$ts does not hold at step S120, the processing goes to step S130 and the next determination processing is executed.

At step S130, the detected temperature t is compared with rise control temperature tu (for example, 70° C.), and if the detected temperature t is higher than the rise control temperature tu (t>tu), the processing goes to one of steps S152, S162 and S172, and processing to restrain temperature rise (temperature rise restraining processing) is executed. On the other hand, if t>tu does not hold at step S130, processing goes to step S140 and the next determination processing is further executed.

At step S140, the detected temperature t is compared with fall control temperature td (for example, 67° C.) set to be several degrees lower than the rise control temperature tu, and if the detected temperature t is equal to or lower than the fall control temperature td (t$\leq$td), the processing goes to one of steps S182, S192 and S202, and processing to cancel the processing performed to restrain temperature rise (temperature rise restraining canceling processing) is executed. On the other hand, if t$\leq$td does not hold at step S140, the processing returns to step S110 and the next temperature detection processing is executed. The purpose of setting the fall control temperature td to be several degrees lower than the rise control temperature tu is to provide hysteresis for stably executing the temperature control.

First, the temperature rise restraining processing executed in the case of t>tu will be described.

In the case of t>tu, first, at step S150, it is determined whether the black levels of the R, G and B signals can be raised or not. That is, it is determined whether the above-described black level adjusting units 822R, 822G and 822B can raise the black levels of the R, G and B signals to be outputted, to gradation levels higher than the currently set black levels. If the black levels can be raised within a black level variable range including plural stages at which the black level can be set as described above, the black level adjusting units 822R, 822G and 822B are controlled via the black level control unit 914 at step S152, thereby executing processing to raise the black levels of the R, G and B signals to be outputted, by one stage. Then, the processing returns to step S110 and the next temperature detection is executed. On the other hand, if the black levels cannot be raised, that is, if the highest gradation level is already set within the gradation level variable range including plural stages at which the black level can be set as the black level and the black levels cannot be raised to any higher gradation level, the processing goes to step S160 and the next determination processing is executed.

At step S160, it is determined whether the quantity of wind of the cooling fan 940 for cooling the R, G and B light valves 400R, 400G and 400B can be increased or not. If the quantity of wind can be increased within a wind quantity variable range including plural stages at which the quantity of wind can be set, the fan driving unit 950 is controlled via the fan control unit 916 at step S162, thereby executing processing to increase the quantity of wind of the cooling fan 940 by one stage. Then, the processing returns to step S110 and the next temperature detection is executed. On the other hand, if the quantity of wind cannot be increased, that is, if the largest quantity of wind is already set within the wind quantity variable range including plural stages at which the quantity of wind can be set and the quantity of wind cannot be increased, the processing goes to step S200 and the next determination processing is executed.

At step S170, it is determined whether the quantity of light exiting from the light source 210 can be reduced or not. If the quantity of light can be reduced within a light quantity variable range including plural stages at which the quantity of light can be set, the lamp driving unit 960 is controlled via the lamp control unit 918 at step S172, thereby executing processing to reduce the quantity of light from the light source 210 by one stage. Then, the processing returns to step S110 and the next temperature detection is executed. On the other hand, if the quantity of light cannot be reduced, that is, if the smallest quantity of light is already set within the light quantity variable range including plural stages at which the quantity of light can be set and the quantity of light cannot be reduced any more, the processing directly returns to step S110 and the next temperature detection is executed.

Next, the temperature rise restraining canceling processing executed in the case of t$\leq$td, will be described.

In the case of t$\leq$td, first, at step S180, it is determined whether the quantity of light exiting from the light source 210 can be increased or not. The processing to reduce the quantity of light within the light quantity variable range including plural stages at which the quantity of light can be set, has been carried out to restrain temperature rise. If this processing can be canceled and the quantity of light can be increased, processing to increase the quantity of light from the light source 210 by one stage is executed at step S182. Then, the processing returns to step S110 and the next temperature detection is executed. On the other hand, if the quantity of light cannot be increased, that is, if the largest quantity of light is already set within the light quantity variable range including plural stages at which the quantity of light can be set and the quantity of light cannot be increased any more, the processing goes to step S190 and the next determination processing is executed.

At step S190, it is determined whether the quantity of wind of the cooling fan 940 can be reduced or not. The processing to increase the quantity of wind within the wind quantity variable range including plural stages at which the quantity of wind can be set, has been performed to restrain temperature rise. If this processing can be canceled and the quantity of wind can be reduced, processing to reduce the quantity of wind of the cooling fan 940 by one stage is executed at step S192. Then the processing returns to step S110 and the next temperature detection is executed. On the other hand, if the quantity of wind cannot be reduced, that is, if the smallest quantity of wind is already set within the wind quantity variable range including plural stages at which the quantity of wind can be set and the quantity of wind cannot be reduced any more, the processing goes to step S200 and the next determination processing is executed.

At step S200, it is determined whether the black levels of the R, G and B signals can be lowered or not. The processing to raise the black levels within the black level variable range including plural stages at which the black level can be set, has been performed to restrain temperature rise. If this processing can be canceled and the black levels can be lowered, processing to lower the black levels of the R, G and B signals by one stage is executed at step S202. Then, the processing returns to step S110 and the next temperature detection is executed. On the other hand, if the black levels cannot be lowered, that is, if the lowest black level is already set within the black level variable range including plural stages at which the black level can be set and the black levels cannot be lowered any more, then processing directly returns to step S110 and the next temperature detection is executed.

In the temperature rise restraining processing in the above-described temperature control operation, the temperatures near the light valves 400R, 400G and 400B are detected, and if the detected temperature t exceeds the rise control temperature tu, the black levels of the R, G and B signals are first raised sequentially within the black level variable range including plural stages at which the black level can be set, and temperature rise is thus restrained. Then, if the temperature rises even when the black levels are raised to the highest level, the quantity of wind of the cooling fan 940 is increased sequentially within the wind quantity variable range including plural stages at which the quantity of wind can be set, and temperature rise is thus restrained. If the temperature rises even when the quantity of wind is increased to the largest quantity, the quantity of light of the light source 210 is reduced sequentially within the light quantity variable range including plural stages at which the quantity of light can be set, and temperature rise is thus restrained. In the temperature rise restraining canceling processing, if the detected temperature t is equal to or lower than the fall control temperature td, the temperature rise restraining processing, which has been executed in the order of the adjustment of the black levels, the adjustment of the quantity of wind, and the adjustment of the quantity of light to restrain temperature rise, is canceled in the reverse order, that is, in the order of cancellation of the adjustment of the quantity of light, the adjustment of the quantity of wind, and the adjustment of the black levels. Thus, the temperatures near the light valves 400R, 400G and 400B can be controlled so as not to exceed the preset temperature (rise control temperature tu), and correspondingly, the temperature rise in the light exiting-side polarizers 402Ro, 402Go and 402Bo of the light valves 400R, 400G and 400B can be restrained.

As described above, in the above-described temperature control operation, since the quantity of light absorbed by the light exiting-side polarizers can be effectively reduced by adjusting the black levels of the R, G and B signals, temperature rise can be restrained without reducing the quantity of incident light on the light valves. Moreover, since the quantity of wind of the cooling fan for cooling the light valves, particularly, for cooling the light exiting-side polarizers, can be reduced as a whole. Thus, since the number of rotations of the cooling fan can be reduced, the resulting noise can be restrained. Also, the fan can be miniaturized.

As the black levels of the R, G and B signals are raised, the luminance of the black level in an image projected from the projector correspondingly becomes higher, thus lowering the contrast of the image.

However, in the case where the projector is used in a bright room, the substantial luminance of the black level of the projected image is increased by the brightness of the room. Therefore, it is considered that there is no problem even if the luminance of the black level of the projected image is increased by raising the black levels of the R, G and B signals as described above. For example, in the case where a projector with a contrast ratio (white to black) of 1000:1 is used in a bright room with a substantial contrast ratio of approximately 20:1, it is considered that there is little effect even if the black levels of the R, G and B signals are raised to lower the contrast ratio of the projector to approximately 50:1.

Moreover, if temperature rise is restrained by the adjustment of the black level, the adjustment of the quantity of wind and the adjustment of the light source lamp in this order as in the above-described temperature rise restraining processing, the temperature rise can be restrained more effectively. Thus, deterioration of the light exiting-side polarizers and the liquid crystal panels due to the temperature rise can be effectively restrained and the lifetime of the apparatus can be extended.

C. Modifications:

Exemplary embodiments of this invention are not limited to the above-described specific examples and embodiment but can be embodied in various modes without departing from the scope of the invention.

Figure 6:
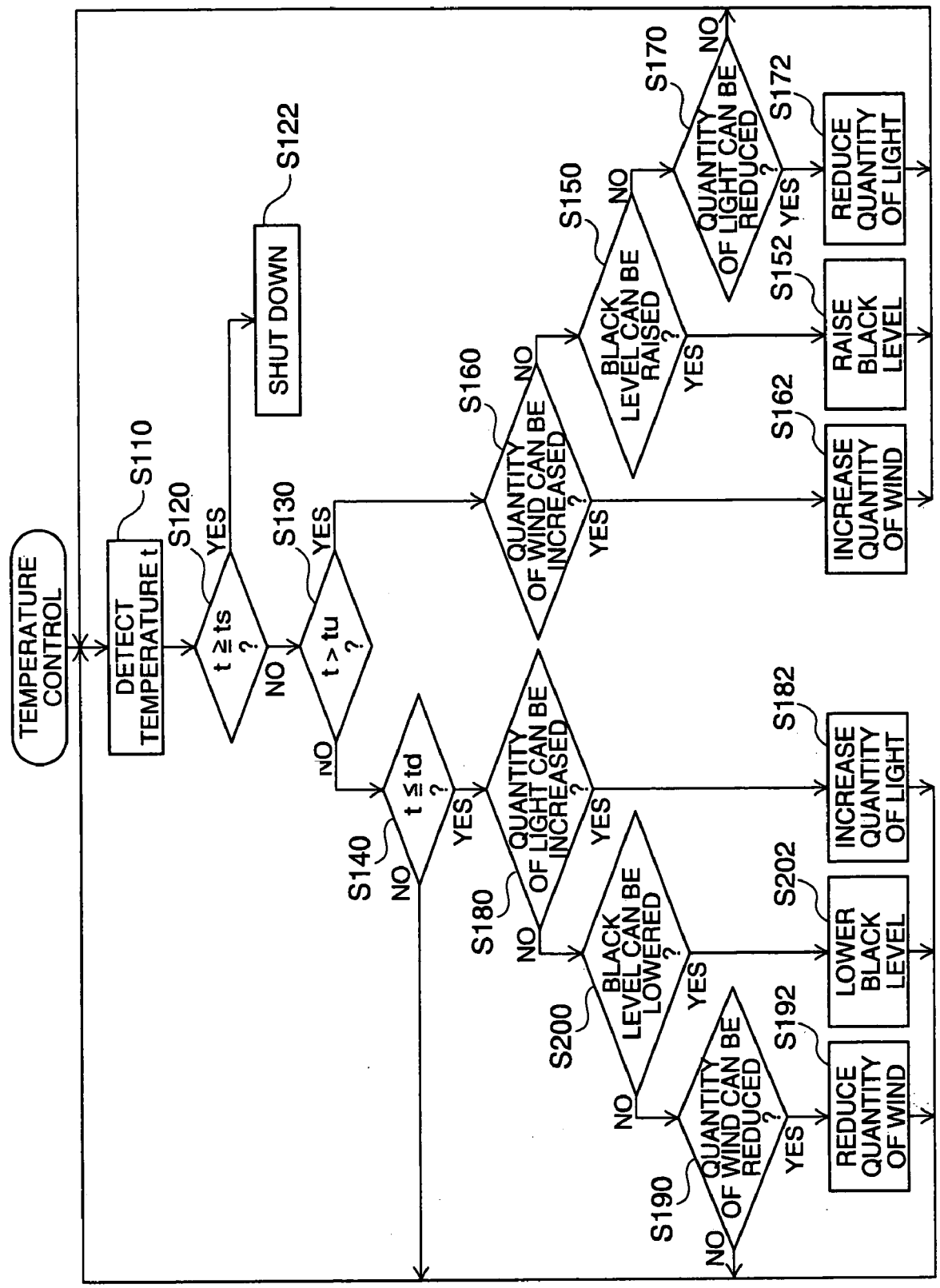
FIG. 6 is a flowchart showing a temperature control operation as a modification.

C1. Exemplary Modification 1:

FIG. 6 is a flowchart showing a temperature control operation as an exemplary modification. In this temperature control operation, the determination processing executed in the order of steps S150, S160 and S170 in the temperature control operation in the example shown in FIG. 5 is carried out in the order of steps S160, S150 and S170. The determination processing executed in the order of steps S180, S190 and S200 in the above-described example is carried out in the order of steps S180, S200 and S190. Corresponding to these differences, the processing to raise the black levels at step S152 and the processing to increase the quantity of wind at step S162 are carried out in the reverse order, and the processing to reduce the quantity of wind at step S192 and the processing to lower the black levels at step S202 are carried out in the reverse order.

In the temperature rise restraining processing in the temperature control operation of the exemplary modification, the quantity of wind is first increased and the black levels are raised then. In the case of raising the black levels, the image quality may be lowered by the reduction in contrast, as described in the above-described example. The temperature control operation of the modification is convenient in the case of giving priority to the image quality of the projected image because temperature rise is restrained by increasing the quantity of wind of the fan before raising the black levels to restrain temperature rise.

C2. Exemplary Modification 2:

In the above-described example and exemplary modification 1, temperature control is executed by adjusting the black levels, the quantity of wind and the quantity of light.

However, temperature control may be executed by adjusting the black levels and the quantity of wind without adjusting the quantity of light.

C3. Exemplary Modification 3:

In the above-described example and exemplary modification 1, the temperature is controlled in accordance with one preset temperature control operation. However, either the temperature control operation in the above-described example or the temperature control operation in exemplary modification 1 may be executed in accordance with a user's instruction inputted via the input operating unit 970.

C4. Exemplary Modification 4:

In the above-described example, the temperature is controlled by changing the black levels, the quantity of wind and the quantity of light. However, the temperature control is not limited to this construction. For example, the temperature may be controlled by adjusting the black levels and the quantity of light without adjusting the quantity of wind. Moreover, the temperature may be controlled only by adjusting the black levels. That is, any construction may be employed as long as it changes at least the black levels.

C5. Exemplary Modification 5:

In the above-described example, the rise control temperature tu is preset, for example, at 70° C. However, the rise control temperature is not limited to this and may be set at various temperatures.

Also, in the above-described example, the fall control temperature td is preset to be several degrees lower than the rise control temperature tu, for example, at 67° C. However, the fall control temperature is not limited to this and may be set at various temperatures lower than the rise control temperature tu. The fall control temperature may be any temperature that enables stable control in relation to the rise control temperature tu.

The rise control temperature tu and the fall control temperature td may be selected from plural candidate temperatures that have been prepared in advance, in accordance with a user's instruction inputted via the input operating unit 970. Alternatively, the user may arbitrarily set these temperatures.

C6. Exemplary Modification 6:

In the above-described example, the black level variable range includes five stages at which the black level can be set, from the $0^{th}$ stage, which is the standard gradation level, to the fourth stage, which is the highest gradation level. However, the black level variable range is not limited to this and may include various numbers of stages as long as the number of stages is two or more.

C7. Exemplary Modification 7:

In the above-described example, lookup tables are used as the black level adjusting units 822R, 822G and 822B. However, the black level adjusting units are not limited to these, and for example, circuits for giving the R, G and B signals an offset corresponding to the gradation level to be set as the black level and for adjusting the gain may be used. Alternatively, circuits for adjusting a clamp level to clamp the minimum level of the R, G and B signals in accordance with the gradation level to be set as the black level may be used.

C8. Exemplary Modification 8:

In the above-described example, the black level variable range is preset. However, the user may selectively set the black level variable range from plural candidates that have been prepared in advance, via the input operating unit 970 in accordance with the brightness of the room where the projector is used. Alternatively, a sensor for measuring the brightness of the room may be provided so that the black level variable range may be automatically set in accordance with the measured brightness of the room. In this way, the black levels can be changed within an optimum variable range that does not affect the substantial contrast of the projected image, in accordance with the brightness of the room.

C9. Exemplary Modification 9:

In the above-described example, the quantity of light exiting from the light source 210 is changed by controlling the lamp driving unit 960, and the incident light on the light valves 400R, 400G and 400B is thus changed. However, the control of the incident light is not limited to this, and a unit for limiting the quantity of passing light, for example, a light valve, may be provided in the optical path of the light exiting from the light source 210 and from falling on the light valves 400R, 400G and 400B to change the quantity of light incident on the light valves 400R, 400G and 400B. That is, any structure may be employed as long as it is a unit for adjusting the quantity of light incident on the light valves 400R, 400G and 400B (incident light quantity adjusting unit).

C10. Exemplary Modification 10:

In the above-described example, the black levels are adjusted on the basis of the detected temperature. However, the adjustment of the black levels is not limited to this. For example, whether or not the black levels should be adjusted on the basis of the detected temperature can be set in accordance with a user's instruction inputted via the input operating unit 970. Alternatively, a black level that the user wants to set can be set from the black level variable range within which the black level can be set, in accordance with a user's instruction inputted via the input operating unit 970.

What is claimed is:

1. A projector, comprising:
    a liquid crystal light valve defining a light exiting surface side, to modulate incident light in accordance with a provided image signal and to project an image represented by modulated light exiting from the liquid crystal light valve, the light valve having a light exiting-side polarizer provided on the light exiting surface side of the liquid crystal light valve;
    a black level adjusting unit to adjust a black level of the image signal;
    a temperature detecting unit to detect temperature of the light exiting-side polarizer; and
    a control unit to control operation of the black level adjusting unit,
    the control unit causing the black level adjusting unit to adjust the black level of the image signal on a basis of the temperature detected by the temperature detecting unit in order to restrain temperature rise in the light exiting-side polarizer.

2. The projector as claimed in claim 1, further comprising:
    a cooling fan to cool the liquid crystal light valve,
    the control unit causing the cooling fan to adjust a quantity of wind of the cooling fan on the basis of the temperature detected by the temperature detecting unit before causing the black level adjusting unit to adjust the black level of the image signal, in order to restrain temperature rise in the light exiting-side polarizer.

3. The projector as claimed in claim 1, further comprising:
a cooling fan to cool the liquid crystal light valve,
the control unit causing the black level adjusting unit to adjust the black level of the image signal and then causing the cooling fan to adjust a quantity of wind of the cooling fan on the basis of the temperature detected by the temperature detecting unit, in order to restrain temperature rise in the light exiting-side polarizer.

4. The projector as claimed in claim 3, further comprising:
an incident light quantity adjusting unit to adjust a light quantity of the incident light,
the control unit causing the black level adjusting unit to adjust the black level of the image signal, then causing the cooling fan to adjust a quantity of wind of the cooling fan, and further causing the incident light quantity adjusting unit to adjust the light quantity of the incident light on the basis of the temperature detected by the temperature detecting unit, in order to restrain temperature rise in the light exiting-side polarizer.

5. The projector as claimed in claim 1, further comprising:
a cooling fan to cool the liquid crystal light valve,
the control unit deciding whether it should operate in a first multiple-control mode to cause the cooling fan to adjust a quantity of wind of the cooling fan on the basis of the temperature detected by the temperature detecting unit before causing the black level adjusting unit to adjust the black level of the image signal in order to restrain temperature rise in the light exiting-side polarizer, or to operate in a second multiple-control mode to cause the black level adjusting unit to adjust the black level of the image signal and then cause the cooling fan to adjust a quantity of wind of the cooling fan on the basis of the temperature detected by the temperature detecting unit in order to restrain temperature rise in the light exiting-side polarizer, in accordance with a user's instruction.

6. The projector as claimed in claim 5, further comprising:
an incident light quantity adjusting unit to adjust a light quantity of the incident light,
the control unit operating in the first or second multiple-control mode and then causing the incident light quantity adjusting unit to adjust the light quantity of the incident light on the basis of the temperature detected by the temperature detecting unit.

7. The projector as claimed in claim 1, further comprising:
an incident light quantity adjusting unit to adjust a light quantity of the incident light,
the control unit causing the black level adjusting unit to adjust the black level of the image signal and then causing the incident light quantity adjusting unit to adjust the light quantity of the incident light on the basis of the temperature detected by the temperature detecting unit, in order to restrain temperature rise in the light exiting-side polarizer.

8. A projector, comprising:
a liquid crystal light valve defining a light exiting surface side to module incident light in accordance with a provided image signal and to project an image representing modulated light exiting from the liquid crystal light valve;
a black level adjusting unit having a first mode to adjust black level of the image signal to a standard gradation level and a second mode to adjust the black level to a gradation level higher than the standard gradation level; and
a control unit to cause the black level adjusting unit to operate in the first mode or the second mode.

9. The projector as claimed in claim 8, the liquid crystal light valve having a light exiting-side polarizer provided on the light exiting surface side of the liquid crystal light valve,
the projector having a temperature detecting unit to detect temperature of the light exiting-side polarizer, and
the control unit deciding whether it should cause the black level adjusting unit to operate in the first mode or the second mode on a basis of the temperature detected by the temperature detecting unit.

10. The projector as claimed in claim 9, further comprising:
a cooling fan to cool the liquid crystal light valve,
the control unit causing the cooling fan to adjust a quantity of wind of the cooling fan on the basis of the temperature detected by the temperature detecting unit before causing the black level adjusting unit to operate in the second mode.

11. The projector as claimed in claim 9, further comprising:
a cooling fan to cool the liquid crystal light valve,
the control unit causing the black level adjusting unit to operate in the second mode and then causing the cooling fan to adjust a quantity of wind of the cooling fan on the basis of the temperature detected by the temperature detecting unit.

12. The projector as claimed in claim 11, further comprising:
an incident light quantity adjusting unit to adjust a light quantity of the incident light,
the control unit causing the black level adjusting unit to operate in the second mode, then causing the cooling fan to adjust a quantity of wind, and further causing the incident light quantity adjusting unit to adjust a light quantity of the incident light on the basis of the temperature detected by the temperature detecting unit.

13. The projector as claimed in claim 9, further comprising:
a cooling fan to cool the liquid crystal light valve,
the control unit deciding whether it should operate in a first multiple-control mode to cause the cooling fan to adjust a quantity of wind of the cooling fan on the basis of the temperature detected by the temperature detecting unit before causing the black level adjusting unit to operate in the second mode, or operate in a second multiple-control mode to cause the black level adjusting unit to operate in the second mode and then further cause the cooling fan to adjust a quantity of wind of the cooling fan on the basis of the temperature detected by the temperature detecting unit, in accordance with a user's instruction.

14. The projector as claimed in claim 13, further comprising:
an incident light quantity adjusting unit to adjust a light quantity of the incident light,
the control unit operating in the first or second multiple-control mode and then further causing the incident light quantity adjusting unit to adjust the light quantity of the incident light on the basis of the temperature detected by the temperature detecting unit.

15. The projector as claim in claim 9, further comprising:
an incident light quantity adjusting unit to adjust a light quantity of the incident light,
the control unit causing the black level adjusting unit to operate in the second mode and then further causing the incident light quantity adjusting unit to adjust the light quantity of the incident light on the basis of the temperature detected by the temperature detecting unit.

16. The projector as claimed in claim 8, the liquid crystal light valve having a light exiting-side polarizer provided on a light exiting surface side of the liquid crystal light valve, the projector having a temperature detecting unit to detect temperature of the light exiting-side polarizer, and the control unit, in a case of causing the black level adjusting unit to operate in the second mode, further causing the black level adjusting unit to operate to adjust the black level of the image signal to plural gradation levels higher than the standard gradation level on the basis of the temperature detected by the temperature detecting unit.

17. The projector as claimed in claim 8, the control unit deciding whether it should cause the black level adjusting unit to operate in the first mode or the second mode, in accordance with a user's instruction.

* * * * *